United States Patent [19]

Stevens et al.

[11] Patent Number: 5,263,864
[45] Date of Patent: Nov. 23, 1993

[54] CAR-ENTRY TRAINING DEVICE FOR WHEELCHAIR-BOUND PATIENTS

[76] Inventors: John Stevens, 5400 Fieldstone Rd., Bronx (Riverdale), N.Y. 10471; John Goetze, Arrow Head Lakes, HC 88 Box 633, Pocono Lakes, Pa. 18347; Robert Scott, 402 Village Rd., Origsburg, Pa. 17961

[21] Appl. No.: 967,138

[22] Filed: Oct. 27, 1992

[51] Int. Cl.⁵ .................................... G09B 19/00
[52] U.S. Cl. ....................................... 434/258
[58] Field of Search .............. 434/29, 62, 69, 70, 434/247, 258; 446/7; 472/59

[56] References Cited

U.S. PATENT DOCUMENTS

| | | | |
|---|---|---|---|
| 1,556,076 | 10/1925 | Chambers | 446/7 |
| 2,994,153 | 8/1961 | Zwolinski | 446/7 |
| 4,276,030 | 6/1981 | Radice | 434/62 |

FOREIGN PATENT DOCUMENTS 3519525  7/1986  Fed. Rep. of Germany ........ 434/69

*Primary Examiner*—Gene Mancene
*Assistant Examiner*—Jeffrey A. Smith
*Attorney, Agent, or Firm*—Herbert Dubno; Andrew Wilford

[57] ABSTRACT

An apparatus for training a gait-impaired person to get into and out of a motor vehicle has a cabin having a hollow interior and opposite right and left sides each formed with a door opening. A respective door at each door opening has an upright front edge hinged on the cabin. A car seat has a seat part and a back part in the cabin adjacent the door. The device can have a support movable in the cabin between a front position and a rear position and carrying both the seat part and back part of a front seat. A car rear seat has a back part fixed on a rear wall of the cabin and a seat part mounted on the support spacedly behind the front seat. In the rear position of the support the back part of the front seat is closely juxtaposed with the back part of the rear seat, the seat part of the rear seat is pushed back underneath the back part of the rear seat, and the front seat is spaced backwardly from the dashboard. In the front position of the support the front seat is nested under the dashboard and spaced forwardly from the back part of the rear seat and the seat part of the rear seat is pulled out from underneath the back part of the rear seat.

6 Claims, 2 Drawing Sheets

CAR-ENTRY TRAINING DEVICE FOR WHEELCHAIR-BOUND PATIENTS

FIELD OF THE INVENTION

The present invention relates to a training device for handicapped persons. More particularly this invention concerns a car-entry device for training wheelchair-bound or otherwise gait-impaired persons to enter into and exit from a car.

BACKGROUND OF THE INVENTION

A person who is learning to use a wheelchair or crutches must be trained to enter into and exit from an automotive vehicle, in particular a car. If the person is able to drive in spite of his or her handicap, he or she must be taught how to get into the front vehicle seat under the steering wheel, and otherwise he or she must be able to enter and exit from the rear seat and the passenger side of the front seat. Patients with spinal injuries must learn to get into and out of the back seat where they travel lying down.

The standard procedure is for the therapist and the patient to make their way to the clinic parking lot and to there practice the necessary maneuvers. Obviously this is neither safe nor convenient. The patient is exposed to the packing-lot traffic and weather, either of which can be inhospitable and can make the training very difficult or impossible.

OBJECTS OF THE INVENTION

It is therefore an object of the present invention to provide an improved device for training gait-impaired patients to get into and out of a motor vehicle.

SUMMARY OF THE INVENTION

An apparatus for training a gait-impaired person to get into and out of a motor vehicle has according to the invention a cabin having a hollow interior and opposite right and left sides each formed with a door opening. A respective door at each door opening has an upright front edge hinged on the cabin. A car seat has a seat part and a back part in the cabin adjacent the door.

Thus this device can be brought right into the therapy space for working with the patients. If it is not to be used with spinal-injury cases who must have a full-length back seat to practice lying down in, the device can be fairly narrow as it need only accommodate one seating position on the seat, using a standard bucket seat. Thus training can be done in any weather without having to transport the trainees outside.

In accordance with a feature of this invention a steering wheel is removably mounted in the cabin in front of the seat and adjacent the left side. In a one-wide cabin the wheel is of course mounted equally close to both sides. Thus the system can be used to train with respect to the passenger and driver sides.

To facilitate moving it about the therapy space, the inventive training apparatus may be equipped with casters or wheels that support the cabin immovably on a floor when locked, but that permit the therapy personnel to move it out of the way when not needed. Mechanism is provided to lock the wheels or otherwise render them effective, for instance by retracting them, to stabilize the device when in use.

In order to facilitate training with respect to a front and a back seat a system according to the invention has a support movable in the cabin between a front position and a rear position and carrying both the seat part and back part of a front seat. A car rear seat has a back part fixed on a rear wall of the cabin and a seat part mounted on the support spacedly behind the front seat. In the rear position of the support the back part of the front seat is closely juxtaposed with the back part of the rear seat, the seat part of the rear seat is pushed back underneath the back part of the rear seat, and the front seat is spaced backwardly from the dashboard. In the front position of the support the front seat is nested under the dashboard and spaced forwardly from the back part of the rear seat and the seat part of the rear seat is pulled out from underneath the back part of the rear seat.

A motor in the cabin has an output connected via a transmission to the support for displacing the support between its positions on operation of the motor output. This transmission has a threaded spindle engaged between the rotary motor output and the support.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
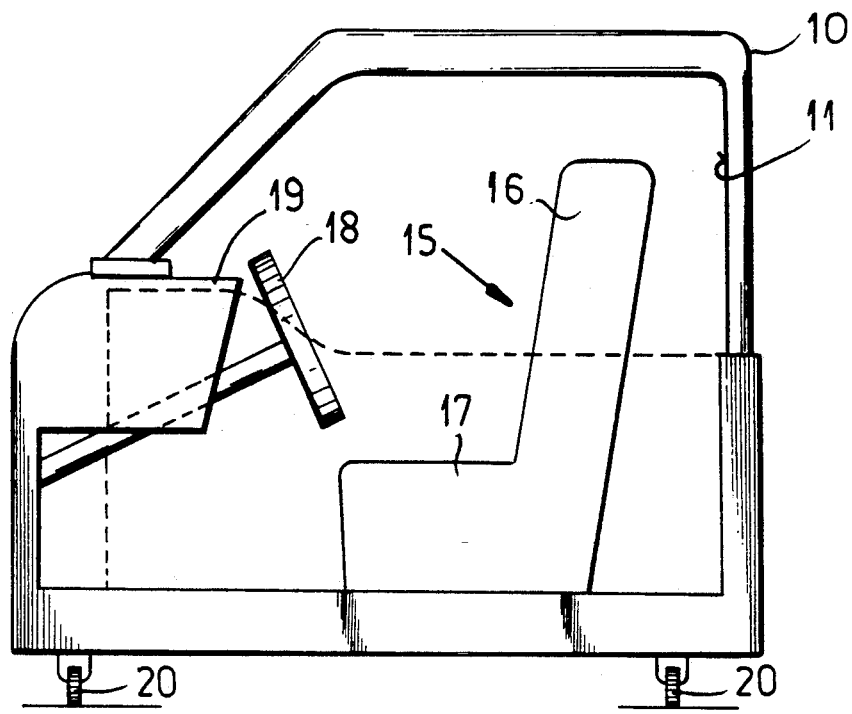
FIG. 1 is a mainly diagrammatic side view of the apparatus of this invention with some parts removed for clarity of view.
Figure 2:
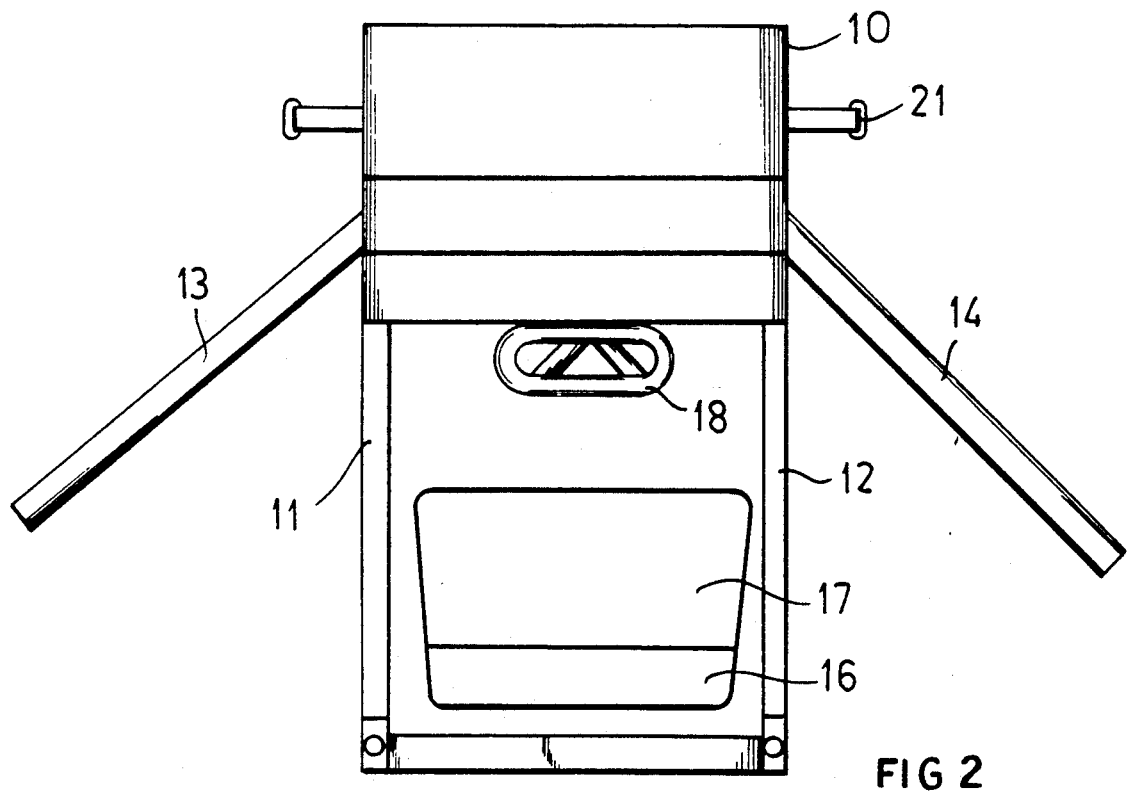
FIG. 2 is a top view of the FIG. 1 apparatus.

As seen in FIGS. 1 and 2 a cabin 10 has a left-hand door opening 11 and a right-hand door opening 12 respectively provided with doors 13 and 14. Inside, the cabin 10 has a standard car seat 15 having a back part 16 and a seat part 17. This seat 5 may be a simple bucket seat or a three-wide bench seat, depending on application. A steering wheel 18 is removably fitted to a hole in a dashboard structure 19 slightly in front of the seat 15. The relative orientation of the seat 15 to the openings 11 and 12 and to the steering wheel 18 and dashboard 19 corresponds to the dimensions found in a standard-size car.

The device can be moved about on casters or wheels 20 that can be retracted upward to leave the cabin 10 standing on feet or braces 21 so it is very stable when in service.

This arrangement can therefore be used to practice getting into and out of either side of a car. The device takes up a relatively modest amount of space so that it can easily be accommodated inside a therapy clinic.

Figure 3:
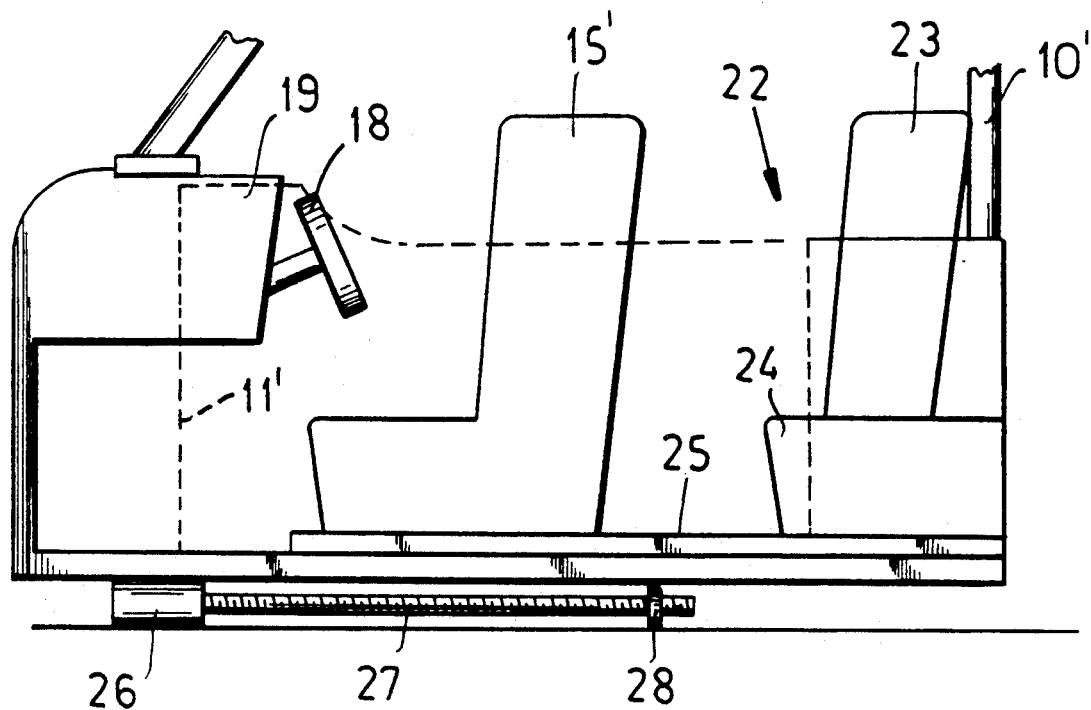
FIG. 3 is a view like FIG. 1 of another apparatus according to the invention.
Figure 4:
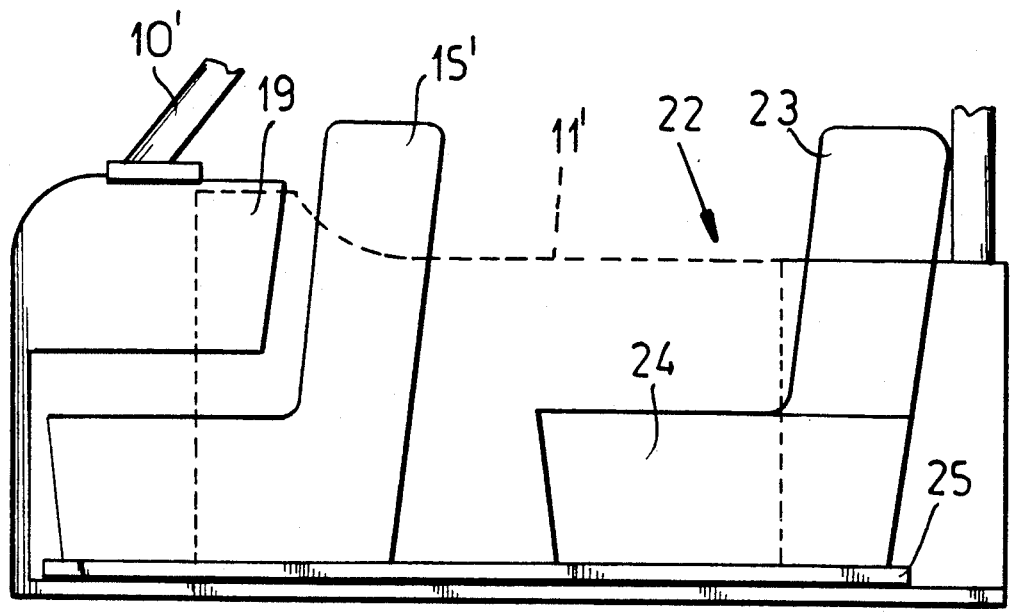
FIG. 4 is a view like FIG. 3 of the FIG. 3 apparatus in another position.

The arrangement of FIGS. 3 and 4 is somewhat more complex. It has a slightly longer cabin 10' whose left-hand door opening is shown at 11'. In this arrangement a front seat 15' like that of FIG. 1 is provided, as well as a back seat 22 having a back part 23 secured to a rear wall of the cabin 10' and a seat part 24. A carriage or support 25 that can slide limitedly front to back carries both the front seat 15' and the seat part 24 of the back seat 22. A motor 26 carried underneath the cabin 10' has an output shaft formed as a threaded spindle 27 threaded at 28 into the support 25 to slide it on rollers back and forth between the rear position of FIG. 3 and the front position of FIG. 4.

Thus for front-seat practice the slide 25 is moved as shown in FIG. 3 to the back position, thereby spacing the front seat 15' back from the dashboard 19, and, if it is in place, from the steering wheel 18. This also pushes the seat part 24 out of the way under the back part 23 and moves the front seat 15' relatively close to the back seat 22, so close as to make the back seat unusable. In this position the person under therapy can practice getting in either side of the front seat of a vehicle.

When the motor 26 has moved the slide/support 25 to the front position of FIG. 4, normally with the wheel 18 removed, the device is ready for back-seat practice. In this position the front seat 15' is pushed forward to nest under the dashboard 19, making it useless, but the seat part 24 is pulled forward and space is created forward of the back seat 22, making the back seat 22 usable. The person under therapy can then practice with the rear seat, which is usually easier as there is no dashboard 19 to negotiate.

We claim:

1. An apparatus for training a gait-impaired person to get into and out of a motor vehicle, the apparatus comprising:
    a cabin having a hollow interior, a front dashboard, and opposite right and left sides each formed with a single door opening;
    respective right and left doors at the door openings and each having an upright front edge hinged on the cabin;
    a support movable front-to-back in the cabin;
    a car front seat having a seat part and a back part in the cabin both mounted on the support;
    a car rear seat behind the front seat and having a back part fixed on a rear wall of the cabin and a seat part mounted on the support spacedly behind the front seat; and
    means for movement of the support in the cabin between
        a rear position with the back part of the front seat closely juxtaposed with the back part of the rear seat, the seat part of the rear seat being pushed back underneath the back part of the rear seat, and the front seat being spaced backwardly from the dashboard, and
        a front position with the front seat nested under the dashboard and spaced forwardly from the back part of the rear seat and the seat part of the rear seat being pulled out from underneath the back part of the rear seat.

2. The training apparatus defined in claim 1, further comprising
    a steering wheel removably mounted in the cabin in front of the front seat and adjacent the left side.

3. The training apparatus defined in claim 1, further comprising
    means for supporting the cabin immovably on a floor.

4. The training apparatus defined in claim 1 wherein the means includes a guide carrying the support in the cabin for front-to-back movement therein.

5. An apparatus for training a gait-impaired person to get into and out of a motor vehicle, the apparatus comprising;
    a cabin having a hollow interior, a front dashboard, and opposite right and left sides each formed with a single door opening;
    respective right and left doors at the door openings and each having an upright front edge hinged on the cabin;
    a support movable in the cabin between a front position and a rear position;
    a car front seat having a seat part and a back part in the cabin both mounted on the support; and
    a car rear seat having a back part fixed on a rear wall of the cabin and a seat part mounted on the support spacedly behind the front seat,
        in the rear position of the support the back part of the front seat being closely juxtaposed with the back part of the rear seat, the seat part of the rear seat being pushed back underneath the back part of the rear seat, and the front seat being spaced backwardly from the dashboard,
        in the front position of the support the front seat being nested under the dashboard and spaced forwardly from the back part of the rear seat and the seat part of the rear seat being pulled out from underneath the back part of the rear seat;
    a motor in the cabin having an output; and
    transmission means connected between the motor output and the support for displacing the support between the positions on operation of the motor output.

6. The training apparatus defined in claim 5 wherein the output is rotary and the transmission means includes a threaded spindle engaged between the output and the support.

* * * * *